(12) United States Patent
Zhao et al.

(10) Patent No.: US 7,808,934 B2
(45) Date of Patent: Oct. 5, 2010

(54) TDD FRAME FORMAT IN WIRELESS MESH NETWORK

(75) Inventors: Zhu Yan Zhao, Beijing (CN); Hao Guan, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 166 days.

(21) Appl. No.: 12/072,963

(22) Filed: Feb. 29, 2008

(65) Prior Publication Data

US 2009/0219839 A1    Sep. 3, 2009

(51) Int. Cl.
*H04J 3/00* (2006.01)
*H04W 4/00* (2009.01)

(52) U.S. Cl. .................. 370/280; 370/294; 370/338
(58) Field of Classification Search .................. None
See application file for complete search history.

(56) References Cited

U.S. PATENT DOCUMENTS

| | | | | |
|---|---|---|---|---|
| 7,555,261 | B2 * | 6/2009 | O'Neill | 455/11.1 |
| 2004/0101037 | A1 | 5/2004 | Meng | 375/220 |
| 2004/0131025 | A1 | 7/2004 | Dohler et al. | 370/328 |
| 2004/0246891 | A1 * | 12/2004 | Kay et al. | 370/215 |
| 2005/0232223 | A1 | 10/2005 | Muller | 370/350 |
| 2006/0120397 | A1 | 6/2006 | Kreiner et al. | 370/437 |
| 2006/0280131 | A1 * | 12/2006 | Rahman et al. | 370/256 |
| 2007/0072604 | A1 * | 3/2007 | Wang | 455/428 |
| 2007/0150928 | A1 | 6/2007 | Hottinen | 725/127 |
| 2007/0268846 | A1 * | 11/2007 | Proctor et al. | 370/279 |
| 2008/0084856 | A1 * | 4/2008 | Ramachandran | 370/342 |
| 2008/0279123 | A1 * | 11/2008 | Struhsaker et al. | 370/280 |
| 2009/0239521 | A1 * | 9/2009 | Mohebbi | 455/422.1 |

FOREIGN PATENT DOCUMENTS

| | | |
|---|---|---|
| GB | 2 398 205 A | 8/2004 |
| WO | WO 2004/062305 A | 7/2004 |

* cited by examiner

*Primary Examiner*—Chi H Pham
*Assistant Examiner*—Soon-Dong D Hyun
(74) *Attorney, Agent, or Firm*—Harrington & Smith

(57) ABSTRACT

In a wireless mesh network a method includes, at a first node, receiving a transmission from a second node during a first sub-frame of a frame with a first transceiver operating with a first center frequency; processing the received transmission; and transmitting, after a predetermined fixed interval, with a second transceiver operating with a second center frequency the processed received transmission to a third node during a second sub-frame of a subsequent frame or of the same frame. Also disclosed are computer programs to execute the method, as well as apparatus constructed to implement the method.

33 Claims, 7 Drawing Sheets

TRANSCEIVER ARCHITECTURE

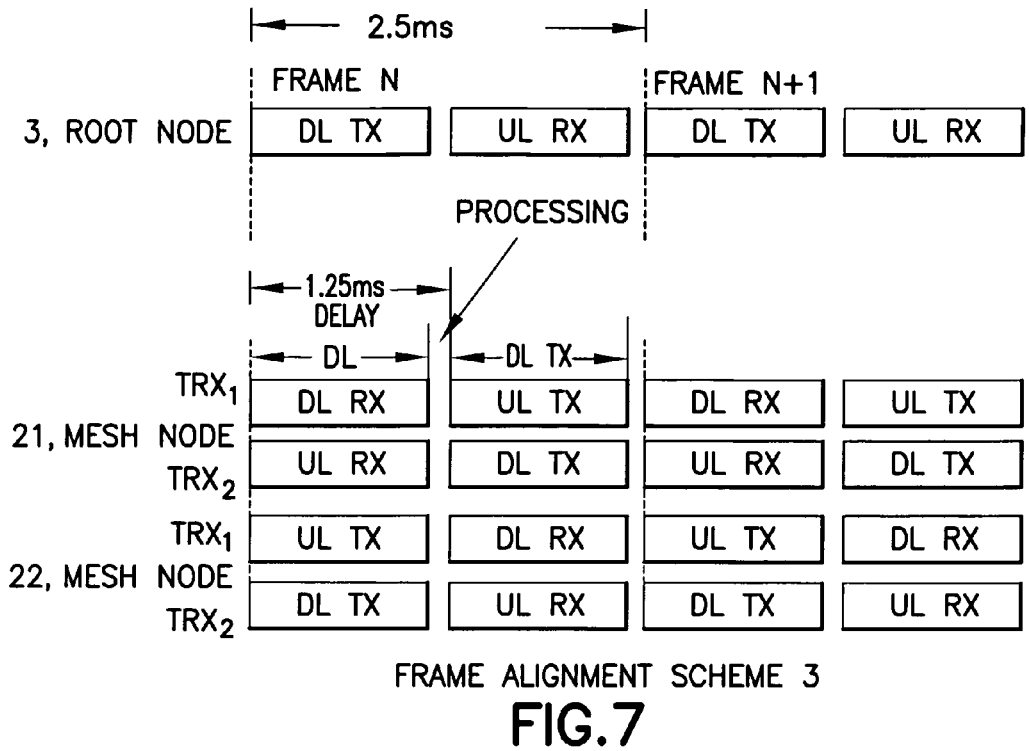
FIG.7 — FRAME ALIGNMENT SCHEME 3
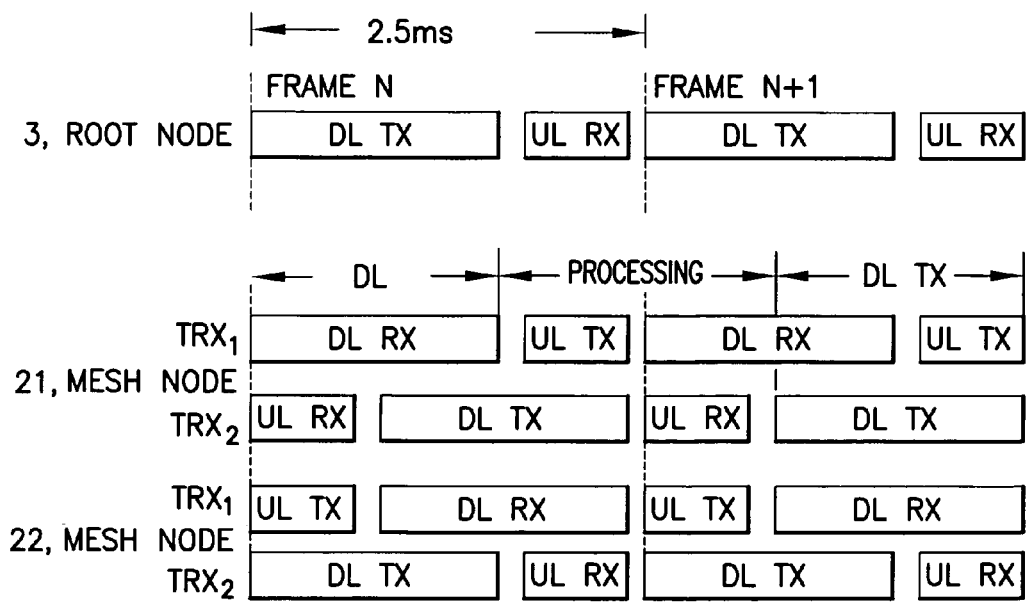
FIG.8 — FRAME ALIGNMENT SCHEME 1 WITH UNBALANCE DL UL

TDD FRAME FORMAT IN WIRELESS MESH NETWORK

TECHNICAL FIELD

The exemplary and non-limiting embodiments of this invention relate generally to wireless communication systems, methods, devices and computer programs and, more specifically, relate to wireless mesh networks and to constituent components thereof.

BACKGROUND

Various abbreviations that appear in the specification and/or in the drawing figures are defined as follows:

| | |
|---|---|
| ADC | analog to digital converter |
| AP | access point |
| BTS | base transceiver station |
| CP | cyclic prefix |
| DAC | digital to analog converter |
| DVB | digital video broadcast |
| FDD | frequency division duplex |
| FFT | fast Fourier transform |
| GPS | global positioning system |
| GSM | global system for mobile communication |
| IFFT | inverse fast Fourier transform |
| IP | internet protocol |
| MAC | medium access control |
| NodeB | base station |
| P/S | parallel/serial |
| QAM | quadrature amplitude modulation |
| S/P | serial/parallel |
| TDD | time division duplex |
| TDM | time division multiplex |
| WCDMA | wideband code division multiple access |
| WLAN | wireless local area network |
| WMN | wireless mesh network |

Wireless mesh networks have been undergoing significant research and development, and interest in high performance infrastructure wireless mesh networks has increased. Different from sensor and ad-hoc networks, with very low energy consumption but low throughput and long delay, the high performance infrastructure WMN is expected to provide carrier-grade service. One important WMN application is to provide wideband data access for mobile users.

The use of a WMN for a purely data backhaul application has also gathered momentum. The WMN backhaul-only focus is on the data transport part, as it can be used to provide data backhaul for the multi-access part in accordance with various requirements, such as WLAN AP, GSM BTS, WCDMA NodeB and DVB-T BTS. By using the WMN based data backhaul network the operator can provide cost effective data backhaul for the NGM (new growth market, both GSM and WBA systems) in a rural area and/or for a micro/Pico BTS in an urban area.

The topology of the WMN-based data backhaul network basically includes a plurality of static nodes which communicate with each other over wireless links. These static nodes function in a manner analogous to wireless routers. Among the static nodes there is at least one root node which connects with the backbone network (which may be, for example, fiber, cable or microwave-based), and the data traffic flows to and from the root node. The WMN-based data backhaul network can be organized as tree structure, implying that at each moment each mesh node in the tree only has one parent node. Conversely, each node may act as parent node for one or more children nodes.

In a wireless mesh network for data backhaul transmission, the path between the root node and a given mesh node can span several hops, and each hop adds an undesirable delay to the transmission. In addition, in some mesh networks the delay of each hop is not fixed and can vary based on, for example, the time of a transmit opportunity. As a result, the total transmission delay can be unknown from transmission to transmission. It is therefore desirable to find an efficient mesh network operational mode that both minimize the multi-hop delay and that provides a known transmission delay.

Reducing the maximum number of hops is a direct method to reduce the transmission delay for a boundary mesh node. However, this approach can reduce the coverage area of the WMN.

Using a reduced frame time one method to reduce the per hop delay. However, as compared to the use of a longer frame the overall data throughput is reduced. Further, in some cases even the use of a very short frame time does not significantly improve the delay experienced by the boundary mesh node.

SUMMARY

The foregoing and other problems are overcome, and other advantages are realized, by the use of the exemplary embodiments of this invention.

In a first aspect thereof the exemplary embodiments of this invention provide a method that includes, at a first node, receiving a transmission from a second node during a first sub-frame of a frame with a first transceiver operating with a first center frequency; processing the received transmission; and transmitting, after a predetermined fixed interval, with a second transceiver operating with a second center frequency the processed received transmission to a third node during a second sub-frame of a subsequent frame or of the same frame.

In a second aspect thereof the exemplary embodiments of this invention provide a computer readable medium that stores computer program instructions, the execution of which at a first node results in operations that comprise receiving a transmission from a second node during a first sub-frame of a frame with a first transceiver operating with a first center frequency; processing the received transmission; and transmitting, after a predetermined fixed interval, with a second transceiver operating with a second center frequency the processed received transmission to a third node during a second sub-frame of a subsequent frame or of the same frame.

In a further aspect thereof the exemplary embodiments of this invention provide an apparatus that includes a first transceiver operating with a first center frequency; a second transceiver operating with a second center frequency; and a processor configurable to respond to receiving a transmission from a first node during a first sub-frame of a frame with the first transceiver for providing the received signal to the second transceiver for processing. The apparatus is further configurable for transmitting with the second transceiver, after a predetermined fixed interval, the processed received transmission to a second node during a second sub-frame of a subsequent frame or of the same frame.

In another aspect thereof the exemplary embodiments of this invention provide an apparatus that includes means for receiving a wireless transmission from a first node during a first sub-frame of a frame. The receiving means comprises a first directional antenna operating at a first frequency in a first time division duplex channel. The apparatus further includes means for processing the received transmission, and means for transmitting, after a predetermined interval, the processed received transmission to a second node during a second sub-frame of a subsequent frame or of the same frame. The transmitting means comprises a second directional antenna operating at a second frequency in a second time division duplex channel. The subsequent frame is one of an immediately subsequent frame or a frame that occurs after an intervening frame.

BRIEF DESCRIPTION OF THE DRAWINGS

In the attached Drawing Figures:

FIG. 2A shows a general example of a TDD frame, while

FIG. 3A is a simplified block diagram of the mesh node shown in FIG. 1, while

FIG. 7 illustrates a third embodiment of a frame alignment scheme in accordance with the exemplary embodiments of this invention.

FIG. 8 illustrates the first embodiment of a frame alignment scheme (FIG. 5) for an unbalanced UL and DL case, further in accordance with the exemplary embodiments of this invention.

DETAILED DESCRIPTION

The exemplary embodiments of this invention relate to wireless mesh network-based data backhaul systems, wherein a mesh node is configured with multi-radio, multi-channel and a directional antenna, and where the radio link of the mesh node is operated in TDD mode. More generally, the exemplary embodiments are applicable to evolutions of cellular systems characterized by the use of multi-radio, multi-channel mesh network technology.

Figure 1:
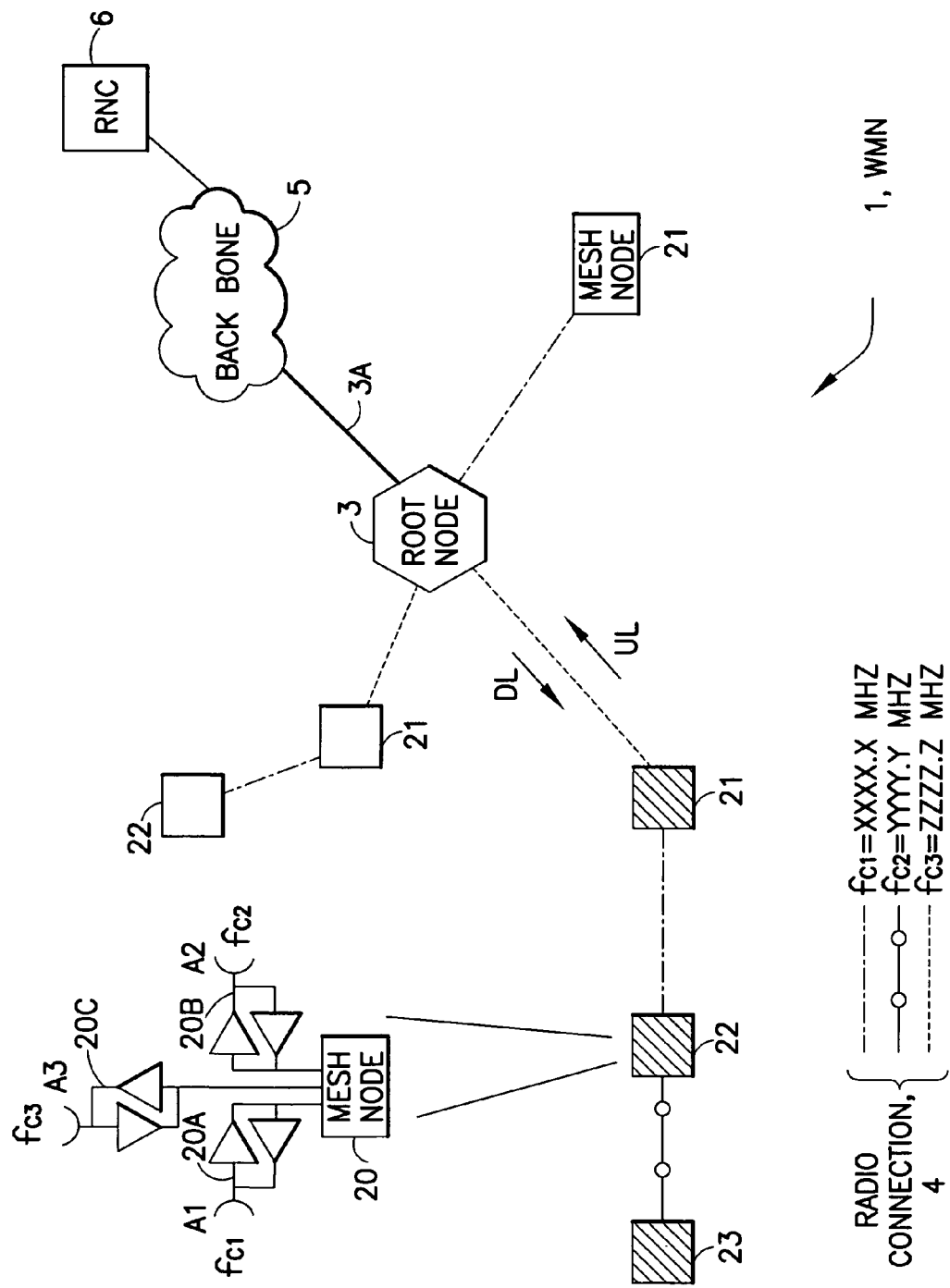
FIG. 1 is a simplified block diagram of an exemplary WMN-based data backhaul network.

FIG. 1 is a simplified block diagram of an exemplary WMN-based data backhaul network 1 that includes a root node 3 and mesh nodes 20 (functioning essentially as wireless routers). Certain mesh nodes 21 are one hop from the root node 3, certain other mesh nodes 22 are two hops from the root node 3 and another mesh node 23 is three hops from the root node 3. The root node 3 is connected to the backbone network 5 (e.g. an IP network) through a link 3A, for example, a fiber, cable or a microwave link. The backbone network 5 can provide connectivity to a radio network controller (RNC) 6 and/or to other network-related control functionality. Radio connections 4 exist between the mesh nodes 21, 22, 23, via directional antennas A1, A2, A3, as well as between mesh nodes 21 and the root node 3. All data traffic and control information to and from individual mesh nodes 20 are routed through the root node 3 (connected with the high bandwidth backbone network 5). It can be appreciated that the traffic load is higher for those mesh nodes (21) closest to the root node 3, as the traffic for the other mesh nodes (22, 23) passes through them.

To increase throughput and reduce delay, the WMN data backhaul nodes use a multi-transceiver structure. Each mesh node 20 (as well as the root node 3) is designed to support several simultaneous (physical) channels using multiple parallel RF front-end chips and baseband processing modules. On top of the physical layer (e.g., an IEEE 802.16d physical layer, as shown in FIG. 3B) there is a MAC layer to coordinate the functions of the multiple channels. From FIG. 1 it can be seen that by allocating proper orthogonal channels to each radio and antenna direction, each mesh node 20 can receive and transmit packets independently in different directions, without considering the interference from/to other nodes.

Figure 4:
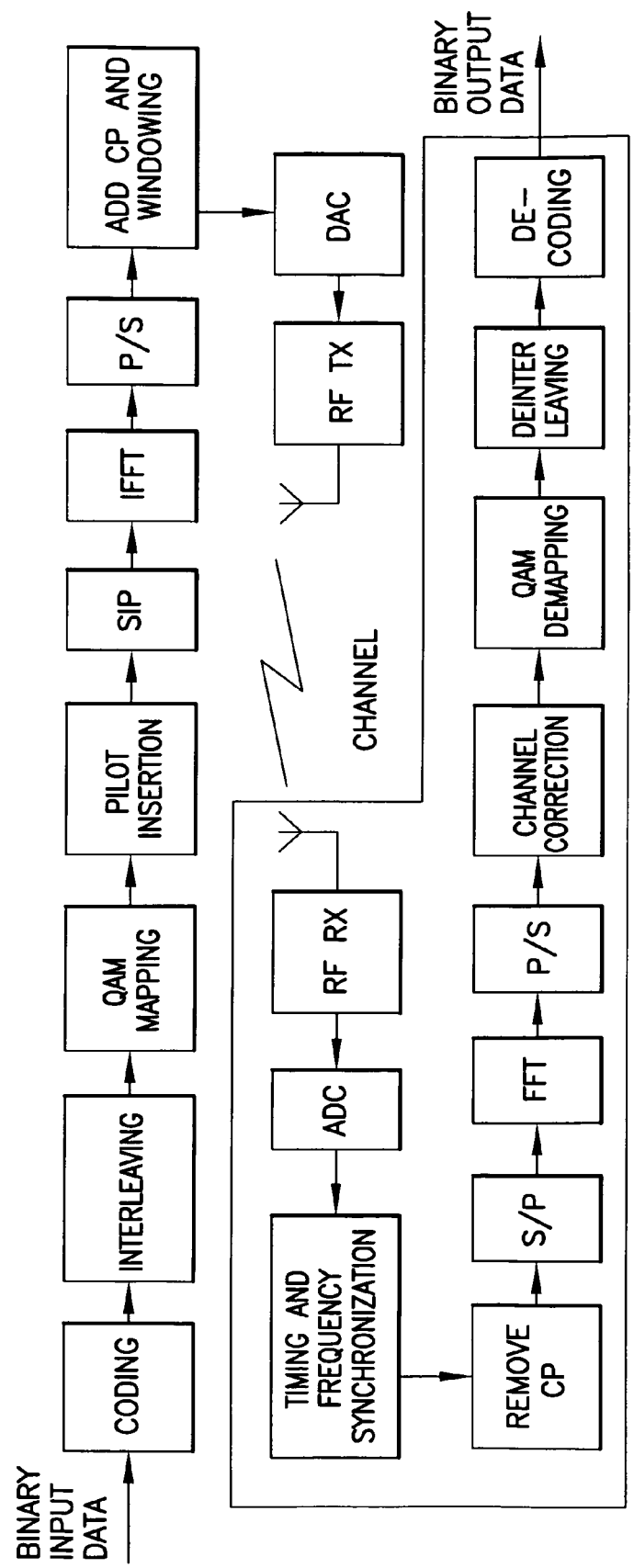
FIG. 4 depicts a non-limiting example of a transceiver architecture.

This multi-channel (multi-orthogonal channel), multi-radio (multi-transceiver) and directional antenna structure provides a large performance improvement for the WMN in capacity and transmission delay, as compared with a WMN having one-channel, one radio and an omni-directional antenna. The radio connections 4 for the mesh nodes 20 may be implemented using any suitable radio technology with a standard or a custom physical layer. In the exemplary embodiments the mesh nodes 20 are assumed to each include a plurality of transceivers 20A, 20B, 20C operating with directional antennas A1, A2, A3 at different frequencies fc1, fc2, fc3, respectively. Note that these exemplary embodiments are not limited for use with three transceivers, antennas, and frequencies. FIG. 4 depicts an exemplary architecture for the transceivers 20A, 20B, 20C, such as one based on the IEEE 802.16d transceiver.

Figure 2A:
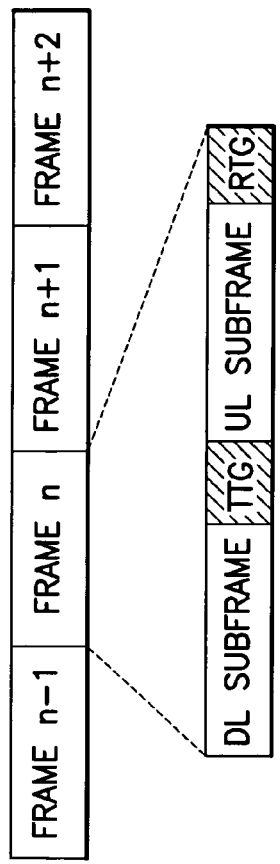
Figure 2B:
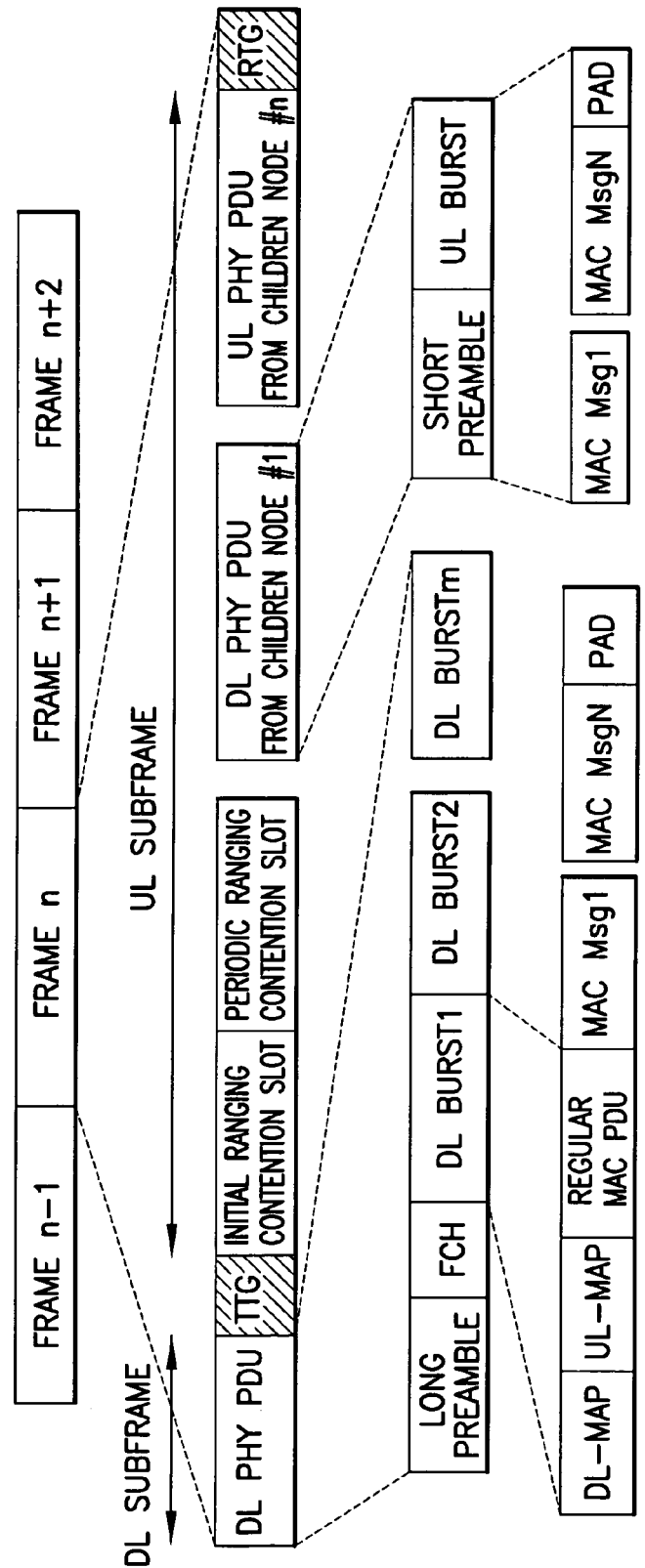
FIG. 2B shows a more detailed depiction of an IEEE 802.16d TDD frame structure (FIGS. 2A and 2B are collectively referred to herein as FIG. 2).

FDD and TDD schemes are currently the most prevalent duplex schemes. FIG. 2A shows a general example of a TDD frame, while FIG. 2B shows a more detailed depiction of the IEEE 802.16d TDD frame structure (as one non-limiting example). As shown in FIG. 2, using the TDD method a single frequency channel is assigned to both the transmitter and receiver. Both the uplink (UL) and downlink (DL) traffic of a wireless pair use the same frequency, but at different times. A guard period (TTG, RTG) is provided for synchronization purposes and to accommodate the turnaround time and the round trip delay whenever switching transmission from DL to UL, and vice versa. In FIG. 2 the TTG (Transmit Transition Gap) is placed between TX and RX periods, and the RTG (Receive Transition Gap) is placed between RX and TX periods. The guard period is typically equal to a unit turn around time plus the round trip delay, so the guard period can be fixed for different frame lengths. It can be observed that there can be loss in throughput when the guard period ratio high (the ratio of the total guard period time to the total frame time) in a TDD frame.

For a wireless pair using the TDD frame some time synchronization is required between the transceiver pair. At the same time, in the case that the TDD frame used in the multi-radio, multi-channel and directional antenna WMN 1, all transceivers 20A, 20B, 20C of each mesh node 20 are time synchronized to a common clock. This is done, for example, to reduce interference, increase transmission efficiency and decrease traffic latency and jitter. There are a number of approaches to implementing a synchronized WMN system, such as by using GPS and TDM emulation over IP.

Figure 3A:
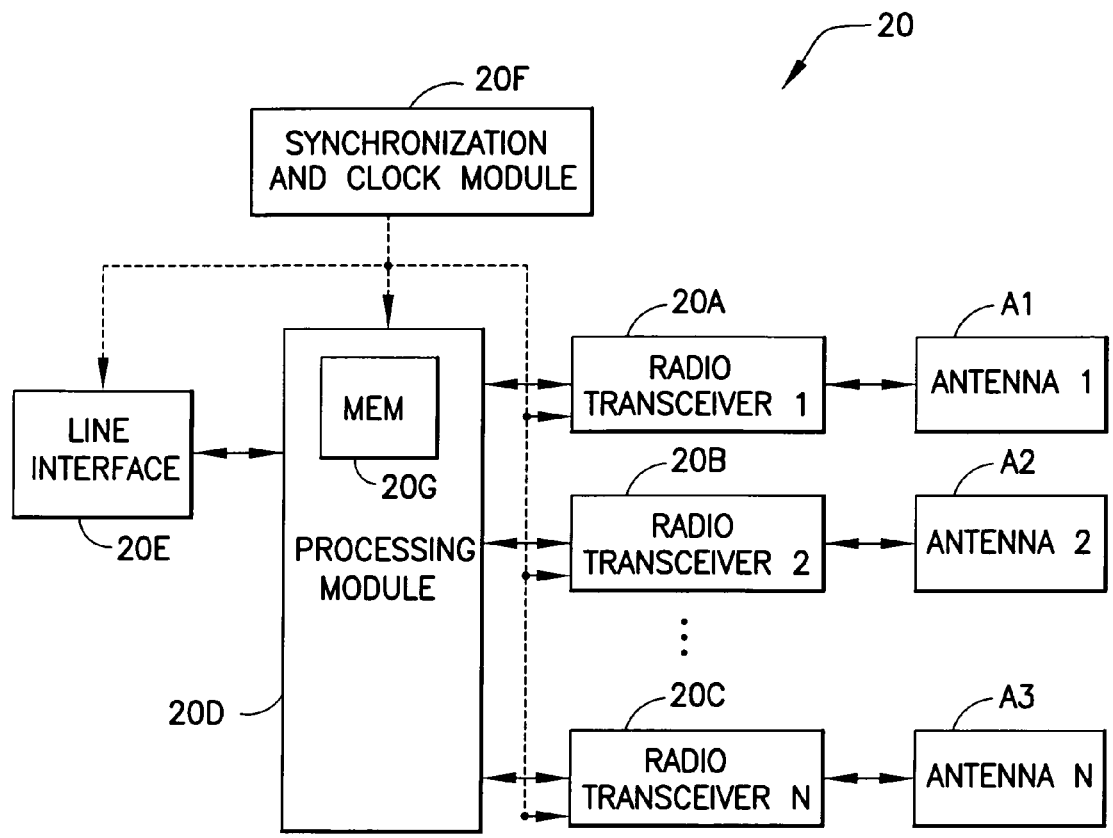
Figure 3B:
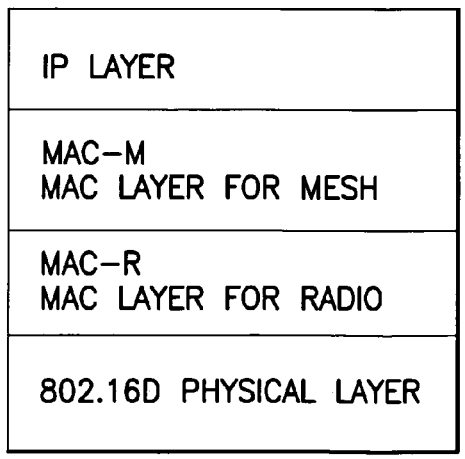
FIG. 3B depicts an exemplary mesh node protocol stack.

FIG. 3A shows the general structure of one of the mesh nodes 20. The typical mesh node 20 includes the several (e.g., three) radio modules or transceivers 20A, 20B and 20C, a processing module 20D, a line interface 20E and a synchronization and clock module 20F. A memory (MEM) 20G is associated with the processing module 20D and stores computer programs that direct the operation of the mesh node 20, as well as buffered transmit and received data, data structures expressive of protocol stacks, packet routing table(s) and the like. The radio transceivers 20A, 20B, 20C process the RF and baseband signals of the wireless links. Each radio transceiver 20A, 20B, 20C is configured with a corresponding antenna element of the antenna array, which is composed of multi-antenna elements, such as three 120 degree antennas or six 60 degree antennas that together may provide 360 degree coverage. The processing module 20D includes one or more data processors for MAC layer and IP layer processing and routing (see the exemplary protocol stack shown in FIG. 3B). When the processing module 20D receives a packet from one of the radio transceivers 20A, 20B or 20C it checks to see if the packet carries a local address. If so, the processing module 20D processes the packet locally. If the packet address indicates that the received packet is not intended for this particular mesh node 20, the processing module 20D checks the routing table stored in the local memory 20G and routes the packet towards the correct child node (downlink) or parent node (uplink) using the corresponding transceiver 20A, 20B or 20C. Since the processing module 20D processes and routes the data packet in the local mesh node 20, the processing time can be very fast as compared with the data packet transmission and processing time in one of the radio transceivers. The processing module 20D also is used to control the radio transceivers 20A, 20B, 20C according to system configuration, such as the used channel, frame structure and transmit and receive time.

The line interface 20E provides the interface between the mesh node 20 and the access device(s) which use the mesh data backhaul. The access devices can be, for example, a WLAN AP, GSM BTS, WCDMA NodeB or a DVB-T BTS. The line interface 20E may be implemented using, for example, Ethernet or T1/E1 technology.

The synchronization and clock module 20F provides a high accuracy clock to synchronize the operation of the mesh node 20 to a system clock (e.g., to a GPS time-based clock, or any other suitable timing source).

Note that the root node 3 can be similarly constructed as the mesh nodes 20, and will in general also include the interface to the data link 3A to the backbone network.

For a wireless mesh network with the multi-channel, multi-radio architecture the mesh node 20 can receive and transmit packets at the same time in different directions using different radio modules, which operate with orthogonal channels. This makes it possible for the mesh node 20 to forward/relay a packet to the next hop mesh node quickly. For example, a particular mesh node 20 can receive a packet in the RX time slot using one radio module (e.g., 20A) and send out the packet in the proper TX time slot using another radio module (e.g., 20B). Ensuring proper alignment of the TX time slot and RX time slot, according to mesh network's topology, would reduce delay and internal interference.

The exemplary embodiments of this invention provide, for the WMN system 1 using multi-radios, multi-channels and directional antennas, closed frame alignment techniques (schemes) between the transceivers in the mesh node 20, and between a transceiver pair of neighboring mesh nodes 20 in a tree branch. The closed frame alignment techniques implement a data packet transmission pipeline along the tree branch of the wireless mesh network 1.

Consider the case of a simple WMN 1 where three mesh nodes 20 connect with the root node 3 through one branch (e.g., as in the lower-most branch shown in FIG. 1, comprised of root node 3 and the cross-hatched mesh nodes 21, 22 and 23. Assume that each of the mesh nodes 20 has three the transceivers TRX1, TRX2, TRX3, each operating in a different frequency band with a different center frequency (channel), and that three transceiver pairs are used to connect the mesh nodes 21, 22, 23 together. The first hop mesh node 21 directly connects with root node 3 using TRX1 at frequency band fc1. TRX1 of the second hop mesh node 22 and TRX2 of the first hop mesh node 21 organize a radio pair at frequency band fc2. TRX1 of the third hop mesh node 23 and TRX2 of the second hop mesh node 22 organize a radio pair at another frequency band. All the TRXs of the mesh nodes 21, 22, 23 are synchronized to a common clock.

Figure 5:
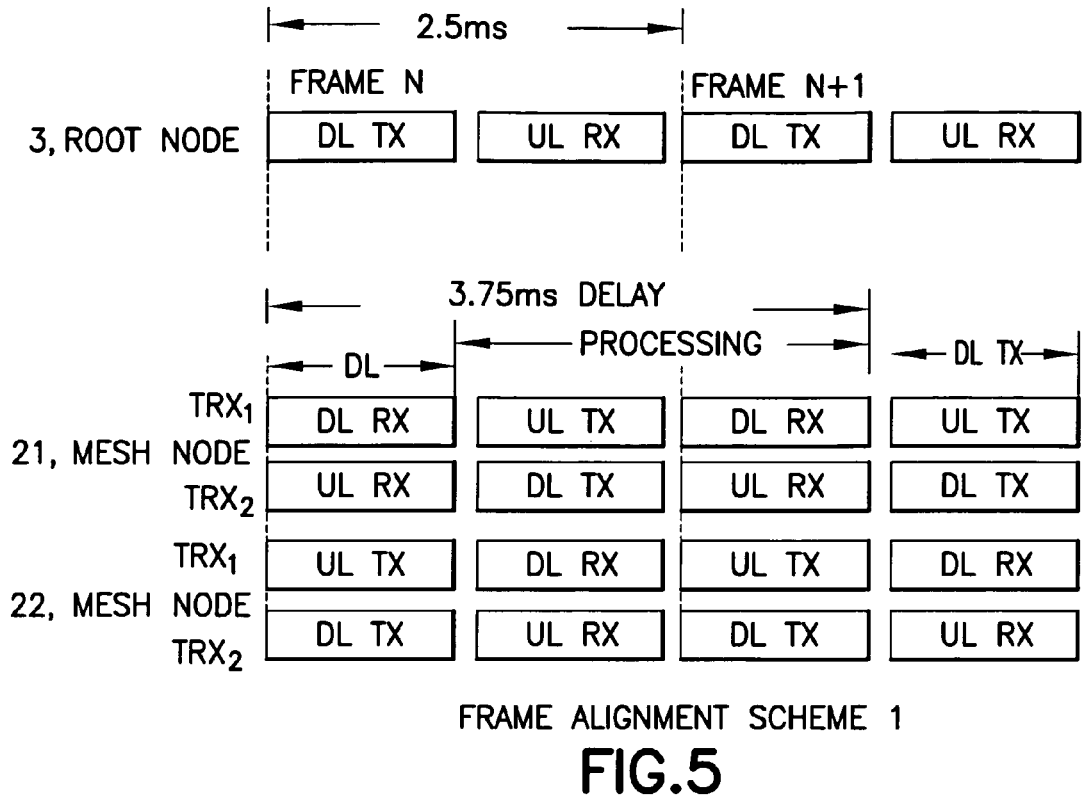
FIG. 5 illustrates a first embodiment of a frame alignment scheme in accordance with the exemplary embodiments of this invention.

FIG. 5 shows a first embodiment of a TDD frame alignment scheme. Mesh node 21 and Mesh node 22 are the mesh nodes of a branch. Here, an exemplary 2.5 ms frame is assumed to be used. In the DL direction, from the root node 3, the root node 3 transmits a data packet to the one hop mesh node 21 using the DL sub-frame, and the corresponding mesh node 21 receives the frame using the corresponding transceiver TRX 1. For the TRX1 of the mesh node 21 the sub-frame is a DL RX sub-frame. In the case that the received packet needs to be transmitted to mesh node 22, the information bits of the packet is sent to TRX2, which is another transceiver of mesh node 21, and TRX2 is used to transmit (and receive) packets to/from the TRX1 of mesh node 22. The packet exchange between the transceivers within the same mesh node 20 is assumed to be fast (e.g., taking a few microseconds), since the data exchange occurs through internal high speed circuitry/communication paths (e.g., a 100 Mbps Ethernet port). The TRX2 then encodes the information and sends the packet in the TX sub-frame. Although the packet exchange speed between the co-located transceivers of the mesh node 21 is very fast, the packet received in the DL RX sub-frame of TRX1 cannot be sent out at once in the following DL TX sub-frame of TRX2. This is due at least to the fact that the transceivers need some finite amount of time to process the input and output radio signals (see again, for example, the transceiver architecture shown in FIG. 4). For the RX the processing time includes channel estimation and frame decoding. For the TX the processing time includes frame coding. When a turbo code and an interleaver are used in radio link the receiver needs to begin to decode the frame after all bits of the frame are received. Since the time distance between the TRX1 DL RX sub-frame and the following TRX2 DL TX sub-frame is the TTG/RTG, and the duration of the TTG/RTG typically too short to perform radio frame processing, the earliest DL transmission opportunity for the TRX2 is in the next following DL TX sub-frame.

For scheme 1, if the frame structure has a symmetric RX sub-frame and TX sub-frame, the total delay of one hop may be assumed to be 3.75 ms (e.g., 1.25 ms is for transmission and 2.5 ms is for TRX packet processing, internal routing and waiting to transmit).

One of the advantages of this TDD frame alignment is that in the same mesh node 20 the RX sub-frame and TX sub-frame of different co-located transceivers use the same time period which may decrease the interference of co-located transceivers. Alternatively, the TX sub-frame of the transceiver may introduce interference to the transceiver in the RX mode. Although in the multi-channel, multi-radio system different channels are used to avoid interference, the presence of sideband leakage power may introduce interference to another nearby transceiver. To avoid the side band leakage interference a wide guard band and/or a high Q filter may be used.

Figure 6:
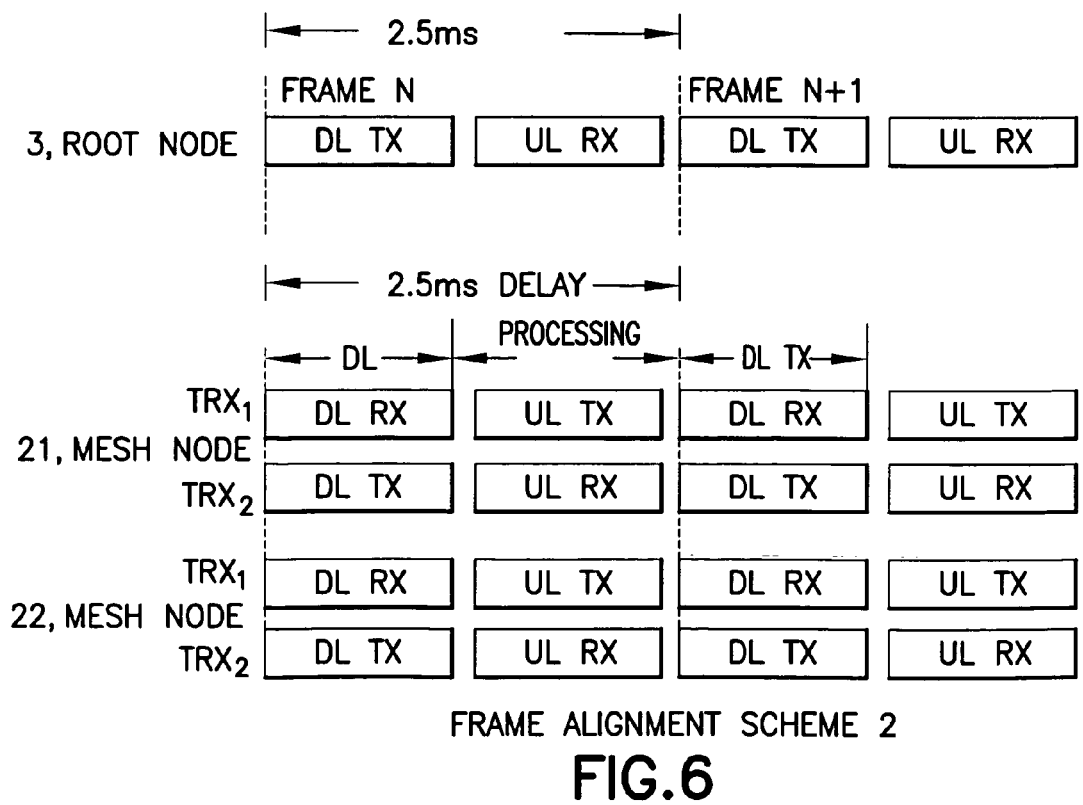
FIG. 6 illustrates a second embodiment of a frame alignment scheme in accordance with the exemplary embodiments of this invention.

FIG. 6 shows a second mesh node TDD frame alignment scheme in the WMN 1. In the DL direction the root node 3 transmits a data packet to the one hop mesh node 21 using the DL sub-frame, and the corresponding mesh node 21 receives the DL sub-frame using the corresponding transceiver TRX 1 (for the TRX 1 of the mesh node 21 the sub-frame is the DL RX sub-frame). In the case that the received packet needs to be transmitted to mesh node 22, the information bits of the packet is sent to the TRX2 in the mesh node 21, and TRX2 is used to transmit (and receive) packets to/from the TRX1 of mesh node 22. The TRX2 then encodes the information bits, and sends the packet in the following DL TX sub-frame. Different from scheme 1, for scheme 2 the time distance between the TRX 1 DL RX sub-frame and the following TRX2 DL TX sub-frame is equal to the sub-frame length, which is assumed to be sufficient for radio processing of the packet in TRX 1 and TRX2. In this case the data packet received from TRX1 can be sent out by TRX2 in the following DL TX sub-frame.

For scheme 2, and assuming that the frame structure has a symmetric RX sub-frame and TX sub-frame, the total delay of one hop is 2.5 ms (e.g., 1.25 ms is for transmission and 1.25 ms for TRX packet processing, internal routing and waiting to transmit).

Compared with scheme 1, the scheme 2 provides a shorter per hop delay. However, in the same mesh node 20 the RX sub-frame and the TX sub-frame of different co-located transceivers use different time periods, which may introduce interference in co-located transceivers. Although in the multi-channel, multi-radio system different channels are used to avoid interference, the presence of sideband leakage power may introduce interference to another nearby transceiver. To avoid the sideband leakage interference a wide guard band and/or a high Q filter may be used.

FIG. 7 shows a third mesh node TDD frame alignment scheme in the WMN 1. It can be noted that all DL RX sub-frame, UL TX sub-frame, UL RX sub-frame and DL TX sub-frame locations are the same as in scheme 1 of FIG. 5. The difference is that the duration of TTG/RTG is made sufficient to accommodate the radio frame processing of TRX1 and TRX2. Note, for example, that the guard time duration of TRX1 between the DL RX sub-frame and the DL TX sub-frame of TRX2 is increased to allow the received packet to be processed and transmitted in the same frame. In scheme 3, the data packet received from TRX1 can be send out by TRX2 in the following DL TX sub-frame. The same applies in the UL direction (e.g., the gap between UL RX and UL TX is increased correspondingly).

Note that this procedure reduces the ratio of the frame length to TX/RX useful bits.

For the scheme 3, and if the frame structure exhibits symmetric RX sub-frame and TX sub-frame lengths, the total delay of one hop is about 1.25 ms (for transmission and packet processing).

Compared with schemes 1 and 2, the use of scheme 3 gives the shortest per hop delay. At the same time scheme 3 also avoids the sideband leakage power interference introduced in scheme 2. This advantage is achieved with some reduction in throughput, due to the long TTG/RTG duration.

For the TDD frame the UL and DL switch point may be modified to realize an unbalanced UL/DL transmission. This is an acceptable approach for packet service, in that typically the DL flow traffic is greater than the UL flow traffic. For example, UL traffic flow may be generated by users who are browsing web sites, while the DL traffic flow may be generated in response to the browsing by downloading web pages and other content.

Figure 9:
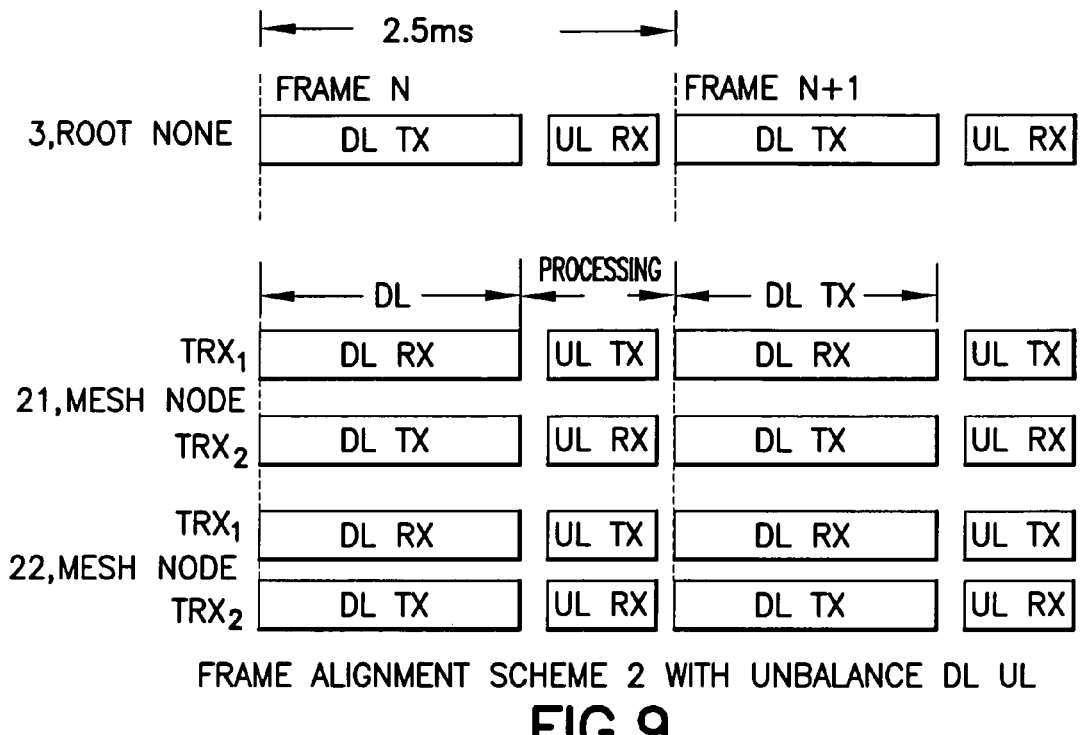
FIG. 9 illustrates the second embodiment of the frame alignment scheme (FIG. 6) for an unbalanced UL and DL case, further in accordance with the exemplary embodiments of this invention.

FIG. 8 illustrates the frame alignment scheme 1 with an unbalanced (non-symmetric) DL/UL sub-frame duration, while FIG. 9 illustrates the frame alignment scheme 2 with the unbalanced (non-symmetric) DL/UL sub-frame duration.

For the TDD frame used in the mesh node 20 with multi-radio, the UL and DL transmission unbalance can be used to advantage. In this case the root node 3 or some other control node may send signaling to adjust the UL/DL switch point of each radio link. This signaling can be used to dynamically and adaptively vary the UL/DL switch points in the different hops as a function of one or more criterion, including a quality of service-related criterion. Overall traffic loading can be considered, as may the nature of the traffic. For example, real time or substantially real time traffic (e.g., voice over IP traffic or streaming video traffic) may require a faster throughput than best effort traffic, and the UL/DL switch points of various radio links can be adjusted accordingly so as minimize the end-to-end delay in one branch but not in another. Note that the signaling to adjust the UL/DL switch point of each radio link may be used to adjust the switch points on a frame-by-frame basis, or at some multiple of a frame time, depending on the conditions.

Note that while the switch point adjustment can result in the transmission delay being different in each different hop, the average (end-to-end) delay may be about the same as in the symmetric UL/DL cases shown in FIGS. 5-7. Note further that even though the UL/DL switch point may be varied, the interval between receiving the packet with the first transceiver and transmitting the processed packet with the second transceiver is still known and determinable on a frame-by-frame basis. That is, the interval between receiving and transmitting may be considered to be a predetermined fixed interval at least on a frame-by-frame basis (or some multiple of a frame basis).

It can be appreciated based on the foregoing description that the use of these exemplary embodiments combines TDD alignment with a mesh network based on a tree topology. In these TDD frame alignment and pipeline techniques for the wireless mesh network (or wireless relay) each mesh node 20 (which may be considered to operate as a relay node) is configured with multiple radios, multiple channels and directional antennas. The radios in the mesh node (relay node) may be configured to operate as a MS mode (connect with parent node) and as a BS mode (connect with the children node). At the same time, there is one and only one radio in a mesh node (relay node) that operates as the MS (connect with parent node). All of the BS radios in the mesh node (wireless relay) synchronize with the MS radio according to the TDD frame alignment and pipeline techniques described herein.

Based on the foregoing it should be apparent that the exemplary embodiments of this invention provide a method, apparatus and computer program(s) to enhance the operation of a TDD multi-radio WMN.

Figure 10:
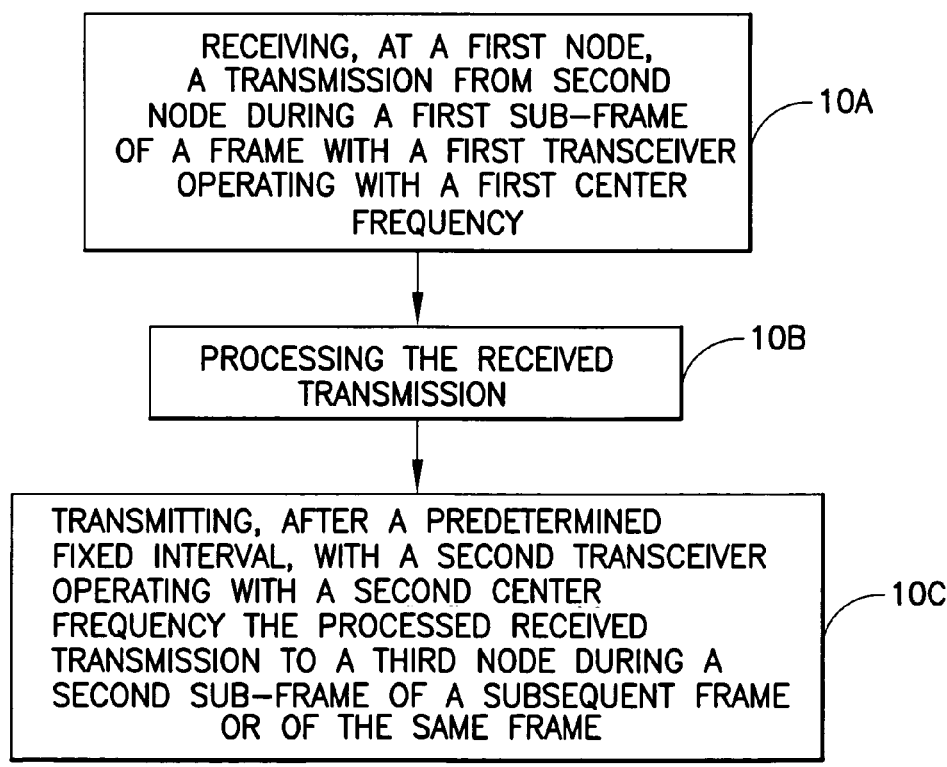
FIG. 10 is a logic flow diagram that illustrates the operation of a method, and a result of execution of computer program instructions, in accordance with the exemplary embodiments of this invention.

FIG. 10 is a logic flow diagram that illustrates the operation of a method, and a result of execution of computer program instructions, in accordance with the exemplary embodiments of this invention. At Block 10A there is a step, executed at a first node, of receiving a transmission from a second node during a first sub-frame of a frame with a first transceiver operating with a first center frequency. At Block 10B there is a step of processing the received transmission. At Block 10C there is a step of transmitting, after a predetermined fixed interval, with a second transceiver operating with a second center frequency the processed received transmission to a third node during a second sub-frame of a subsequent frame or of the same frame.

In the method of the preceding paragraph, where the subsequent frame is an immediately subsequent frame, or where the subsequent frame occurs after an intervening frame.

In the method of the preceding paragraphs, where in one case the second node is a root node, where the first node is a first hop node relative to the root node, and where the third node is a second hop node relative to the root node, while in another case the second node is the second hop node relative to the root node, where the first node is the first hop node relative to the root node, and where the third node is the root node.

In the method of the preceding paragraphs, where when transmitting the processed received transmission to the third node during the second sub-frame of the same frame, the step of processing occurs during a guard time between the first sub-frame and the second sub-frame.

In the method of the preceding paragraphs, where the frame is a time division duplex frame comprised, for a given one of the first transceiver and the second transceiver, of a transmit sub-frame and a receive sub-frame, and where a duration of the transmit sub-frame is equal to the duration of the receive sub-frame, or where the duration of the transmit sub-frame is not equal to the duration of the receive sub-frame.

In the method of the preceding paragraph, where for the case that the duration of the transmit sub-frame is not equal to the duration of the receive sub-frame, the duration of at least one of the transmit sub-frame and receive sub-frame is set in accordance with signaling, and may be adjustable on a frame-by-frame basis.

In the method of the preceding paragraphs, where the step of receiving occurs through a first directional antenna, and where the step of transmitting occurs through a second directional antenna.

In the method of the preceding paragraphs, where the method is executed in a node that comprises part of a wireless mesh network having a tree topology.

The various blocks shown in FIG. 10 may be viewed as method steps, and/or as operations that result from operation of computer program code, and/or as a plurality of coupled logic circuit elements constructed to carry out the associated function(s).

These exemplary embodiments can be seen to also pertain to and provide an apparatus that includes means for receiving a wireless transmission from a first node during a first sub-frame of a frame, where the receiving means comprises a first directional antenna operating at a first frequency in a first time division duplex channel. The apparatus also includes means for processing the received transmission. The apparatus also includes means for transmitting, after a predetermined interval, the processed received transmission to a second node during a second sub-frame of a subsequent frame or of the same frame. The transmitting means includes a second directional antenna operating at a second frequency in a second time division duplex channel, where the subsequent frame is one of an immediately subsequent frame or a frame that occurs after an intervening frame.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of prestored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WMN 1 that uses IEEE 802.16-type technology, it should be appreciated that the exemplary embodiments of this invention are not limited for use with only this one particular type of wireless communication system, and that they may be used to advantage in other wireless communication systems. Further, the various numbers of mesh nodes 20, the numbers of transceivers per node, the frame, sub-frame and guard time durations and the like are all meant to be non-limiting examples.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several nonlimiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
  at a first node, receiving a radio frequency transmission from a second node during a first sub-frame of a frame with a first transceiver operating with a first center frequency;
  processing the received radio frequency transmission; and after a predetermined fixed interval, transmitting with a second transceiver operating with a second center frequency a radio frequency transmission with the processed received radio frequency transmission to a third node during a second sub-frame of a subsequent frame or of the same frame.

2. The method of claim 1, where the subsequent frame is an immediately subsequent frame.

3. The method of claim 1, where the subsequent frame occurs after an intervening frame.

4. The method of claim 1, where the second node is a root node, where the first node is a first hop node relative to the root node, and where the third node is a second hop node relative to the root node.

5. The method of claim 1, where the second node is a second hop node relative to a root node, where the first node is a first hop node relative to the root node, and where the third node is the root node.

6. The method of claim 1, where when transmitting the processed received radio frequency transmission to the third node during the second sub-frame of the same frame, the step of processing occurs during a guard time between the first sub-frame and the second sub-frame.

7. The method of claim 1, where the frame is a time division duplex frame comprised, for a given one of the first transceiver and the second transceiver, of a transmit sub-frame and a receive sub-frame, and where a duration of the transmit sub-frame is equal to the duration of the receive sub-frame.

8. The method of claim 1, where the frame is a time division duplex frame comprised, for a given one of the first transceiver and the second transceiver, of a transmit sub-frame and a receive sub-frame, and where a duration of the transmit sub-frame is not equal to the duration of the receive sub-frame.

9. The method of claim 8, where the duration of at least one of the transmit sub-frame and receive sub-frame is set in accordance with signaling.

10. The method of claim 8, where the duration of at least one of the transmit sub-frame and receive sub-frame is adjustable on a frame-by-frame basis.

11. The method of claim 1, where the step of receiving occurs through a first directional antenna, and where the step of transmitting occurs through a second directional antenna.

12. The method of claim 1, executed in a node that comprises part of a wireless mesh network having a tree topology.

13. A memory that stores computer program instructions, the computer program instructions executed by a processor to perform operations that comprise:
receiving a radio frequency transmission from a second node during a first sub-frame of a frame with a first transceiver operating with a first center frequency;
processing the received radio frequency transmission; and
after a predetermined fixed interval, transmitting with a second transceiver operating with a second center frequency a radio frequency transmission with the processed received radio frequency transmission to a third node during a second sub-frame of a subsequent frame or of the same frame.

14. The memory of claim 13, where the subsequent frame is an immediately subsequent frame.

15. The memory of claim 13, where the subsequent frame occurs after an intervening frame.

16. The memory of claim 13, where the second node is a root node, where the first node is a first hop node relative to the root node, and where the third node is a second hop node relative to the root node.

17. The memory of claim 13, where the second node is a second hop node relative to a root node, where the first node is a first hop node relative to the root node, and where the third node is the root node.

18. The memory of claim 13, where when transmitting the processed received radio frequency transmission to the third node during the second sub-frame of the same frame, the step of processing occurs during a guard time between the first sub-frame and the second sub-frame.

19. The memory of claim 13, where the frame is a time division duplex frame comprised, for a given one of the first transceiver and the second transceiver, of a transmit sub-frame and a receive sub-frame, and where a duration of the transmit sub-frame is equal to the duration of the receive sub-frame.

20. The memory of claim 13, where the frame is a time division duplex frame comprised, for a given one of the first transceiver and the second transceiver, of a transmit sub-frame and a receive sub-frame, and where a duration of the transmit sub-frame is not equal to the duration of the receive sub-frame.

21. The computer readable medium memory of claim 20, where the duration of at least one of the transmit sub-frame and receive sub-frame is set in accordance with signaling, and may be
adjustable on a frame-by-frame basis.

22. The memory of claim 13, where the step of receiving occurs through a first directional antenna, and where the step of transmitting occurs through a second directional antenna.

23. The computer readable medium memory of claim 13, embodied in a node that comprises part of a wireless mesh network having a tree topology.

24. An apparatus, comprising:
at least one processor; and
at least one memory including computer program code, where the at least one memory and the computer program code are configured, with the at least one processor, to cause the apparatus to at least:
receive a radio frequency transmission from a first node during a first sub-frame of a frame with a first transceiver;
provide the received radio frequency transmission to a second transceiver for processing; and
after a redetermined fixed interval, transmit with the second transceiver operating with a second center frequency, a radio frequency transmission with the processed received radio frequency transmission to a second node during a second sub-frame of a subsequent frame or of the same frame.

25. The apparatus of claim 24, where the subsequent frame is one of an immediately subsequent frame or a frame that occurs after an intervening frame.

26. The apparatus of claim 24, where the first node is a root node, where the apparatus is embodied in a first hop node relative to the root node, and where the second node is a second hop node relative to the root node.

27. The apparatus of claim 24, where the first node is a second hop node relative to a root node, where the apparatus is embodied in a first hop node relative to the root node, and where the second node is the root node.

28. The apparatus of claim 24, where when transmitting the processed received radio frequency transmission to the second node during the second sub-frame of the same frame the processing occurs during a guard time between the first sub-frame and the second sub-frame.

29. The apparatus of claim 24, where the frame is a time division duplex frame comprised, for a given one of the first transceiver and the second transceiver, of a transmit sub-frame and a receive sub-frame, and where a duration of the transmit sub-frame is one of equal to the duration of the receive sub-frame or not equal to the duration of the receive sub-frame.

30. The apparatus of claim 29, where the duration of at least one of the transmit sub-frame and receive sub-frame is set in accordance with signaling, and may be adjustable on a frame-by-frame basis.

31. The apparatus of claim 24, where the first transceiver operates with a first directional antenna, and where the second transceiver operates with a second directional antenna.

32. The apparatus of claim 24, embodied in a node that comprises part of a wireless mesh network having a tree topology.

33. An apparatus, comprising:

means for receiving a radio frequency transmission from a first node during a first sub-frame of a frame, said receiving means comprising a first directional antenna operating at a first frequency in a first time division duplex channel;

means for processing the received radio frequency transmission; and means for transmitting, after a predetermined interval, a radio frequency transmission with the processed received radio frequency transmission to a second node during a second sub-frame of a subsequent frame or of the same frame, said transmitting means comprising a second directional antenna operating at a second frequency in a second time division duplex channel, where the subsequent frame is one of an immediately subsequent frame or a frame that occurs after an intervening frame.

* * * * *

UNITED STATES PATENT AND TRADEMARK OFFICE
CERTIFICATE OF CORRECTION

PATENT NO.       : 7,808,934 B2
APPLICATION NO.  : 12/072963
DATED            : October 5, 2010
INVENTOR(S)      : Zhao et al.

Page 1 of 1

It is certified that error appears in the above-identified patent and that said Letters Patent is hereby corrected as shown below:

Claim 21, col. 12, line 22 delete "computer readable medium" in between the and memory.

Claim 23, col. 12, line 30 delete "computer readable medium" in between the and memory.

Signed and Sealed this
Twenty-eighth Day of December, 2010

David J. Kappos
*Director of the United States Patent and Trademark Office*